Oct. 18, 1949.　　　　　E. I. VALYI　　　　　2,485,336
MOLDING MACHINE

Filed Sept. 26, 1946　　　　　　　　　　3 Sheets-Sheet 1

INVENTOR.
EMERIK I. VALYI
BY
Wm. S. Pritchard
ATTORNEY.

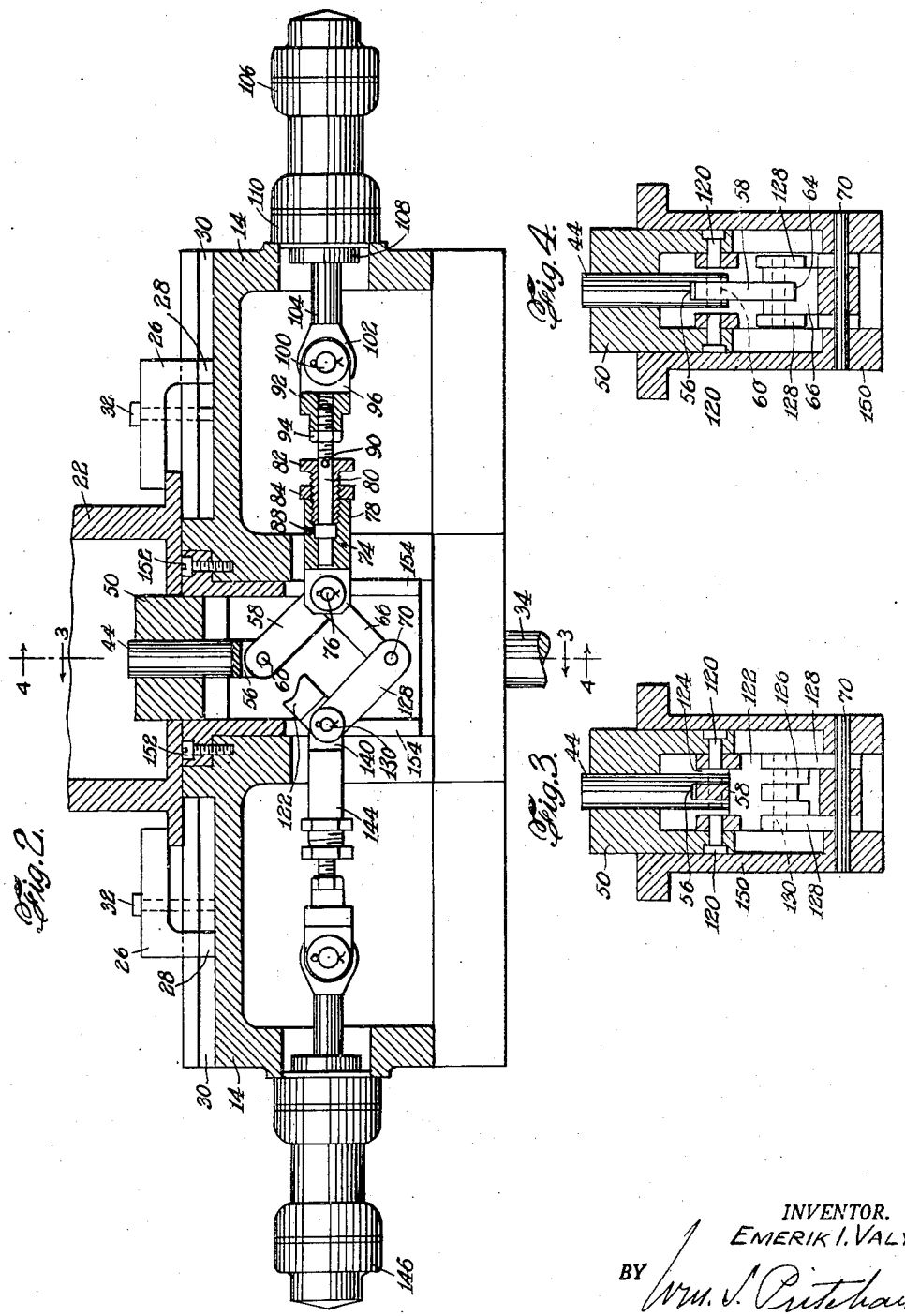

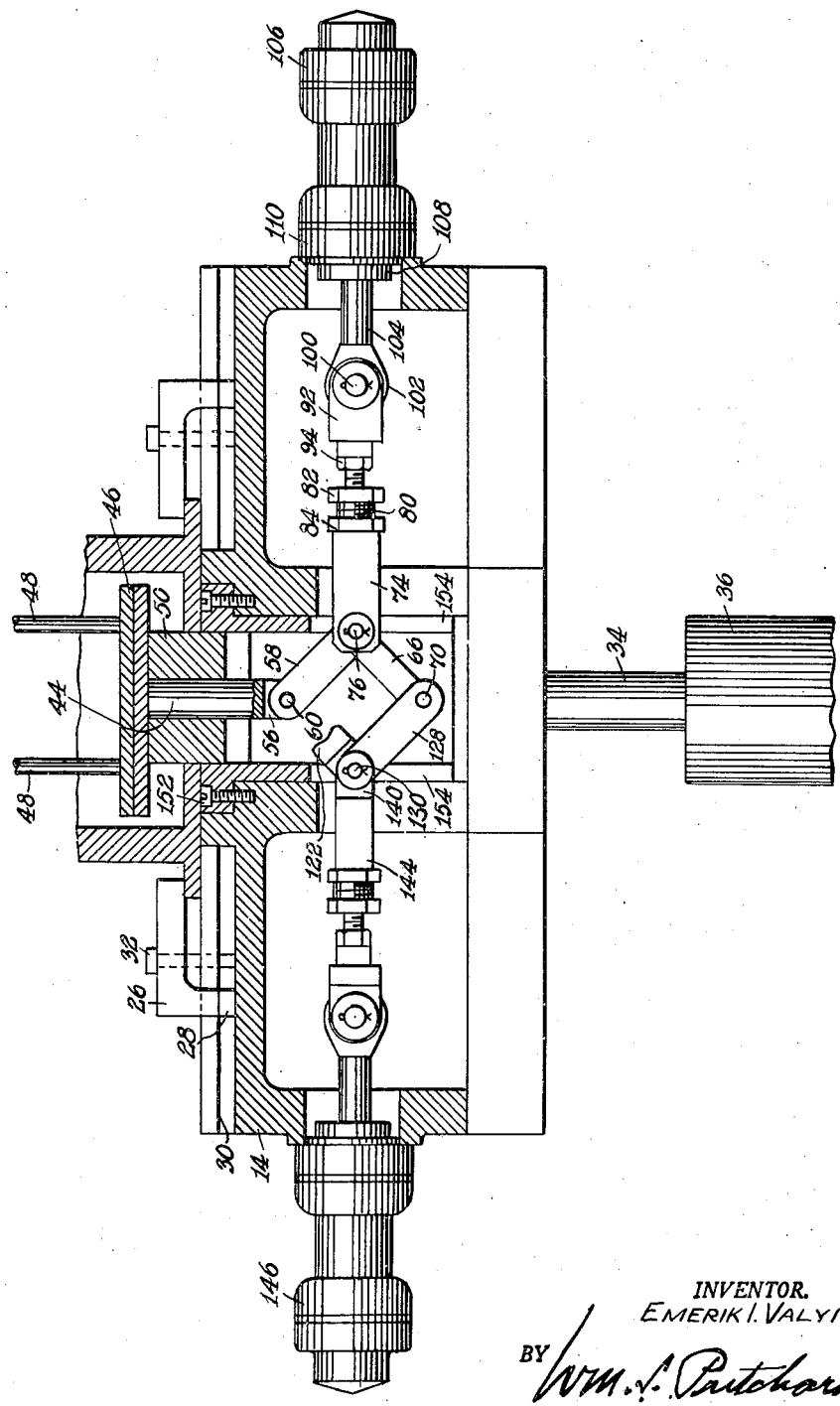

Patented Oct. 18, 1949

2,485,336

UNITED STATES PATENT OFFICE 2,485,336

MOLDING MACHINE

Emerik I. Valyi, New York, N. Y.

Application September 26, 1946, Serial No. 699,547

8 Claims. (Cl. 18—16)

1

This invention relates to molding machines. More particularly, it relates to a new and improved ejecting mechanism for molding machines.

In conventional injection-molding machines wherein the molding cavity is formed by a pair of complemental relatively movable die members, the casting is removed from the die by ejector pins after the die members have been separated. In general, in such machines the ejector pins are carried on an ejector plate which, in turn, is secured to an ejector rod projecting from the movable platen (mold clamp). The ejector rod, as the mold clamp moves in its opening stroke, strikes and engages a stationary part of the machine whereby, during further descent of the movable platen, the ejector plate and the pins carried thereby are actuated to eject the molding from the die.

In conventional injection-molding machines wherein cores are utilized, the molding is either stripped from the cores by the ejecting mechanism previously described, or the molding together with the cores are ejected by the ejecting mechanism and thereafter the cores manually pulled or moved by means dependent on the stroke.

In each of the aforementioned injection-molding machines, the removal of the molding from the die is effected during and is dependent on the opening stroke of the mold clamp.

An object of this invention is to provide an ejecting mechanism for a molding machine which is operative independently of the stroke of the opening clamp.

Another object of this invention is to provide an ejecting mechanism for an injection-molding machine which can be operated at any position of the clamp and independently of the stroke of said clamp.

An additional object of this invention is to provide a core puller for an injection-molding apparatus which is operative independently of the stroke of the opening clamp.

A further object of this invention is to provide a core puller for an injection-molding apparatus which can be operated in any position of the clamp and independently of the stroke of said clamp.

A still further object of this invention is to provide a core puller and an ejector for an injection-molding apparatus, said core puller and ejector being separately operated in the desired sequence and independently of the stroke of the opening clamp.

2

Other and additional objects will become apparent hereinafter.

The objects of this invention are accomplished, in general, by associating a core plate and an ejector plate with the die member carried by the movable clamp of an injection-molding machine, and providing separate means to actuate the core plate and the ejector plate in the desired sequence independently of each other and the stroke of the opening clamp.

The core plate is secured to a plunger (herein called "core plate plunger") which, in turn, is connected to an appropriate linkage to which the necessary movement is imparted for actuation of the plunger in the desired direction and whereby the plunger is moved in a straight line path. The ejector plate is secured to a second plunger (herein called "ejector plate plunger") which, in turn, is appropriately connected to a second linkage to which the necessary movement is imparted for actuation of the ejector plate in the desired direction and whereby the plunger is moved in a straight line path. The ejector plate plunger is preferably hollow and the core plate plunger is movably positioned therein axially thereof. The linkage to which the core plate plunger and the linkage to which the ejector plate plunger are respectively secured are of such constructions that movement of either will not interfere with movement of the other. Each of the linkages is respectively connected to separate means which are hydraulically actuated to impart the desired movements to the respective linkages and hence to the plungers connected thereto.

In that embodiment of the invention wherein solid castings are made and cores are not utilized, the core plate is omitted and the ejector plate is positioned on both of the previously described plungers, and either one can be operated to effect the ejecting action after the movable clamp has been opened to any desired position.

The invention may be clearly understood by reference to the following detailed description when taken in connection with the accompanying drawings, in which:

Figure 2 is an enlarged view, partly in section, of the respective linkages and operating mechanisms;

Figure 3 is a section taken on the line 3—3 of Figure 2;

Figure 4 is a section taken on the line 4—4 of Figure 2; and

Figure 5 is a section of that embodiment of the invention as applied to an injection-molding machine which does not utilize cores.

Figure 1:
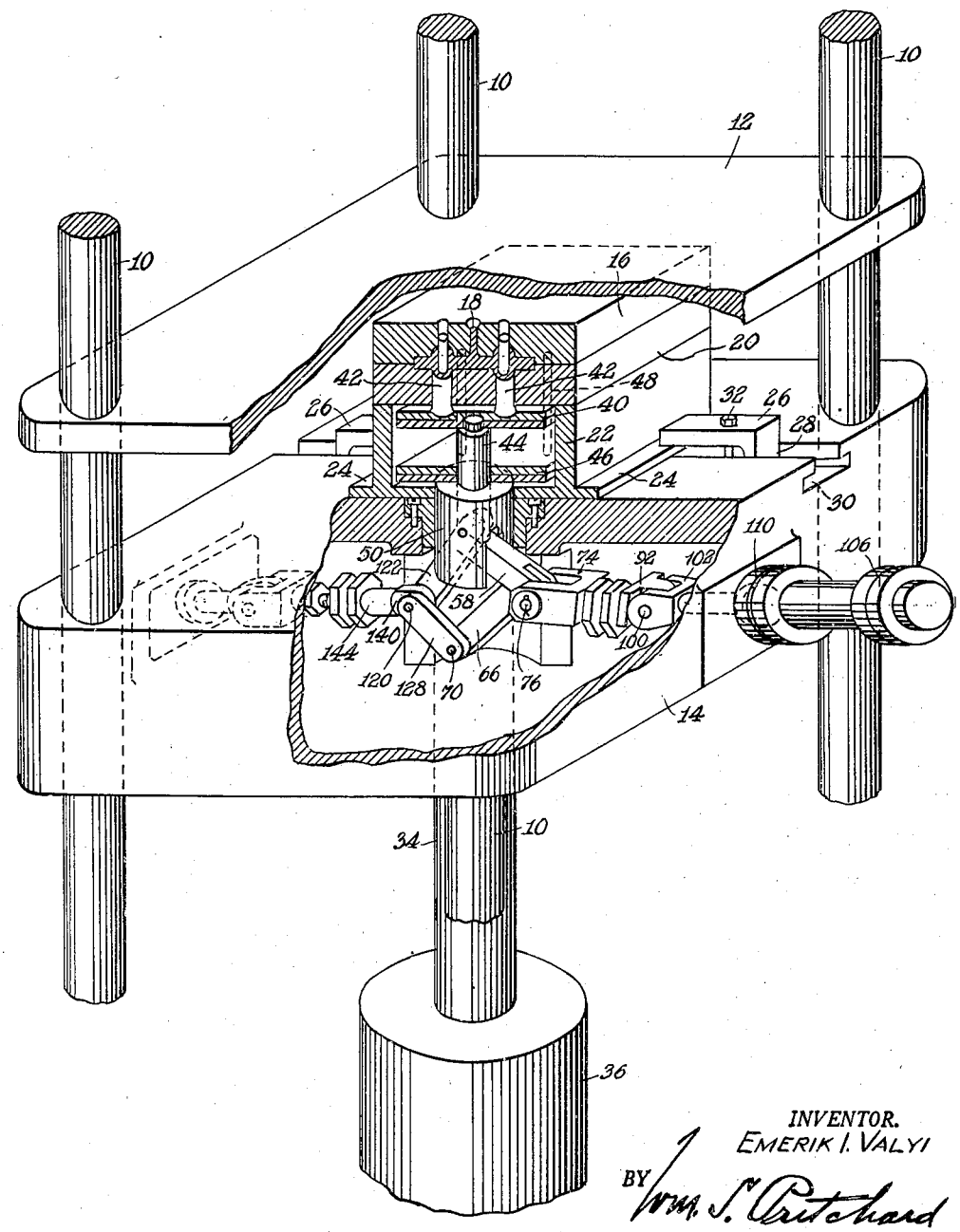
Figure 1 is a perspective view, partly broken away and partly in section, of an injection-molding machine containing the core puller and ejector mechanisms.

Referring now to the drawings wherein like reference numerals designate like parts, the reference numeral 10 designates a plurality of rods which are appropriately secured and fixedly mounted in the machine and on which a platen 12 is fixedly secured and a movable platen 14 is appropriately mounted for sliding movement thereon. An upper die member 16 is appropriately removably secured to the under surface of the top fixed platen 12. The die member 16 is provided with a passage 18 which is connected to a gate (not shown) and into which the material to be molded is introduced.

The upper die member 16 is designed to cooperate with a lower die member 20. The two die members 16 and 20 are complemental and, when in molding position as hereinafter more fully described, will provide a molding cavity or cavities of the desired shapes and sizes.

The lower die member 20 is appropriately removably secured onto an ejector box 22, the bottom of which is seated on and adjustably secured to the lower platen 14. The bottom of the ejector box 22 is provided with side flanges which are adapted to be engaged by spaced clamps 26. Each clamp 26 is formed with a T-shaped tongue 28 which is slidably positioned in a T-slot 30 in the lower platen 14 and is secured in clamping position by a lock screw 32.

The lower platen 14 is secured at its bottom to the top of a piston 34 which is actuated by hydraulic means, generally designated by the reference numeral 36, in the usual manner to raise and lower the platen 14. If desired, the usual hydraulic means (not shown) can cooperate with the top platen 12.

In the ejector box 22, there is provided a core plate 40 which carries cores 42. The core plate 40 is appropriately and removably secured to the top of a core plunger 44. An ejector plate 46 carrying ejector pins 48 is also positioned in the ejector box 22. The ejector plate 46 is appropriately and removably secured to an ejector plunger 50. As is shown in Figure 1, the core plate 40 is located above the ejector plate 46, and both of such plates are adapted for movement in the ejector box 22.

The ejector plate plunger 50 is made hollow and the core plate plunger 44 is positioned axially therein.

The core plate plunger 44 and the ejector plate plunger 50 are, in accordance with the principles of this invention, adapted to be moved independently of each other and independently also of the movement of the lower platen when it is moved to open the die. The mechanisms for effecting such independent operations and movements will now be described.

The core plate plunger 44 is slotted at its lower end, as indicated by the reference numeral 56, and one end of a link 58 is disposed therein. The link 58 and the plunger 44 are secured together by a press-fitted pin 60. The other or lower end of the link 58 is positioned in a slot 64 in one end of a link 66. The other end of the link 66 is mounted on a fixed pivot 70.

The slotted end of the link 66 is positioned in the forked end of a link 74. A pin 76 pivotally secures the links 58, 66 and 74 together. It is manifest that upon imparting motion in the desired direction to the link 74, such motion will be transmitted through the links 58 and 66 to elevate or lower the core plate plunger 44.

The forked link 74 is provided with a housing 78 into which there is positioned one end of an adjusting rod 80. The rod 80 is secured in the housing 78 by a coupling 82 and a lock nut 84 threadedly secured on the coupling 82. A set screw 88 cooperating with the rod 80 serves to prevent the rod 80 from rotary movement in the housing 78. A pin 90 extending through the coupling 82 also aids in preventing rotary movement of the rod 80.

The portion of the rod 80 extending beyond the coupling 82 is threaded and is threadedly secured in a connecting member 92. A lock nut 94 locks the rod 80 in the connecting member 92. The member 92 is provided with a male member 96 which is pivotally secured on a pin 100 in a forked member 102. The forked member 102 is secured to a piston rod 104 which cooperates with a hydraulic cylinder 106 which is operated in the usual manner. The piston rod 104 extends through supporting plates 108 and 110 appropriately mounted on the lower platen. It is to be noted that the pivot 100 is fixed and travels in a straight line in a direction depending on the movement of the piston rod 104. However, the coupling 92 is pivotally mounted on the pivot 100 and therefore will move about such pivot depending on the direction of movement of the piston rod 104.

The ejector plate plunger 50 is secured by pressed pins 120 to one end of a link 122. The link 122 is provided with a slot 124 to permit clearance of the core plate plunger 44 during the movement thereof. The link 122 is formed on its opposite end with a forked end 126 which is disposed between a pair of spaced links 128, which are pivotally mounted on the fixed pivot 70. A pin 130 pivotally connects the forked end 126 of the link 122 to the links 128. It is apparent that upon imparting movement in the desired direction to the links 122 and 128 at their pivot points 130, links 128 will be moved about the pivot 70 and the ejector plate plunger raised or lowered.

A link 140 having a male member 142 is positioned so that such male member will be disposed in the slot 124 of the link 122. Such male member 142 will be secured in such slot by the pin 130.

The link 140 is provided with a housing 144, and movement is imparted to the link 140 from the hydraulic cylinder 146 by means identical with those for imparting movement to the link 74 from the hydraulic cylinder 106. For convenience, the parts intermediate the hydraulic cylinder 146 and the housing 144, which are identical to corresponding parts between the hydraulic cylinder 106 and the link 74, are designated by corresponding reference numerals.

The lower platen 14 is formed with a chamber which permits the location and disposition of the assembled linkages and means for operating the same to be positioned therein.

The two sets of linkages are disposed in a link housing 150 which is secured to the platen 14 by means of the screws 152. The link housing 150 is slotted, as indicated by the reference numerals 154 and 156, to permit movement of the respective links. The fixed pivot 70, it is to be noted, is secured adjacent the lower end of the link housing 150, as shown in Figures 3 and 4.

In operation, the desired die member 16 is secured to the upper platen 12 and the desired complemental die member 20, together with the appropriate ejector box 22, is clamped in proper position on the lower platen 14 by means of the clamps 26. The core plate 40 is secured to the core plate plunger which is in position so that, upon actuation of its linkage as previously described, it will move in a direction (downward) to pull the cores. The ejector plate 46 is secured to or permitted to rest on the ejector plate plunger 50 which is in position so that, upon actuation of its linkage as previously described, it will move in a direction (upward) to strip the molding from the die. The hydraulic mechanism 36 is actuated to elevate the lower platen and clamp the die member 16 in close intimate relationship with the die member 20. At this stage, the core plate 40 and the ejector plate 46 are positioned as shown in Figure 1. Also, at this stage of operation, the respective links actuating the core plate plunger 44 and the ejector plate plunger 50 will be in the position as shown in Figure 4.

The plastic to be molded, which is previously preheated, is forced under pressure through the gate and through the passage 18 to fill the die cavities. After the molding has cooled sufficiently, the hydraulic means 36 is actuated so that it will cause the lower platen to descend and separate the die members 16 and 20 from each other.

At any desired time after the lower die member 20 has separated from the die member 16, the hydraulic mechanism 106 is actuated whereby the core plate plunger 44 is caused to descend, the ejector plate being provided with a hole to permit the necessary movements of said plunger. During this operation, the cores 42 are pulled. After the cores have been pulled, the hydraulic means 146 is actuated so that the ejector plate plunger 50 moves upwardly. This upward movement of the ejector plate plunger 50 causes the ejector plate 46 and the ejector pins 48 carried thereby to be moved upwardly, whereby the molding is stripped from the die. After the molding has been removed, the respective hydraulic means 106 and 146 are actuated to restore the core plate 40 and the ejector plate 46 to the original molding position, and the cycle of operations previously described repeated.

Though hereinbefore the invention has been described as applied to an injection-molding machine for the molding of articles requiring the use of cores, it is to be understood that the invention is not restricted thereto. The invention is equally applicable for use in injection-molding machines for molding solid articles which do not require the use of cores. In such an embodiment of the invention, the core plate and cores described in the preceding embodiment are omitted and the ejector plate is disposed on both of the plungers 44 and 50, as shown in Figure 5. It is to be noted that in the form of the invention shown in Figure 5, at the beginning of the molding operation the hydraulic means 106 which actuates plunger 44 is in position so that, upon actuation thereof, the plunger 44 will be elevated.

In the form of the invention shown in Figure 5, the die members are clamped into position and the ejector plate rests on both of the plungers 44 and 50. After the molding operation and the molding has sufficiently cooled, the hydraulic means 36 is actuated so as to move the lower platen downwardly whereby the die members are separated. After separation, the operator can operate either hydraulic means 106 whereby plunger 44 is caused to move in an upward direction or operate hydraulic mechanism 146 whereby plunger 50 will be caused to move in an upward direction. The movement of either of plungers 44 or 50, or both of them, will elevate the ejector plate 46 whereby the ejector pins 48 carried thereby will eject the molding from the die.

As is apparent from the foregoing embodiments, the plungers and their actuating mechanisms can be used without change with either dies having both ejecting means and a core-pulling means or dies having only ejecting means. In general, the invention can be utilized to actuate any mechanism associated with the die in an injection-molding machine and which removes or aids in removing the molding from the die cavity.

When the injection-molding machine is intended to produce only solid moldings (not requiring the use of cores), not only can the core plate be omitted but also the core plate plunger and the actuating mechanism therefor. In such a machine, the plunger-actuating mechanism can include either of the linkage systems hereinbefore described.

The invention, though it is admirably suitable for use in connection with injection-molding machines with or without cores, is not restricted thereto. It can be utilized in molding machines of any type wherein the die members which form the molding cavity are movable relative to each other and which utilize ejecting pins with or without core pullers.

In general, the invention can be applied to molding machines, such as injection-molding machines, die-casting machines, compression-molding machines, transfer-molding machines, powder-metallurgy pressers, ceramic-compression pressers, or the like, irrespective of whether the die members move relative to each other in a horizontal or vertical direction.

The invention can be applied to molding machines, irrespective of the size of the moldings. Whenever necessary, the stroke of the plungers 44 and 50 can be adjusted by adjustment of the length of the respective adjusting rods 80 secured in the links 92. Due to the fact that the piston rods 104 move in a straight line and the respective linkages are pivotally mounted about a fixed pivot 70, the movement imparted to the respective plungers by the respective linkages will be in a straight line.

The ejection and core-pulling operations, when used, are effected separately and independently of each other. These operations are also effected independently of the movement of the lower platen. As a matter of fact, these operations can be effected after the dies have been separated and the lower platen is stationary. Of course, the operations can also be effected after separation and during the movement of the lower platen away from the upper platen.

Since it is obvious that various changes and modifications may be made in the above description without departing from the nature or spirit thereof, this invention is not restricted thereto except as set forth in the appended claims.

I claim:

1. A molding machine comprising a pair of relatively movable platens, a die member carried by each of said platens, means to move one of said platens, a core plate carried by said movable platen, a core plate plunger secured to said core plate, an ejector plate carried by said movable platen, ejecting pins carried by said ejector plate, an ejector plate plunger on which said ejector plate is seated, a linkage connected to said core plate plunger, means to actuate said linkage whereby said core plate plunger is moved independently of the movement of the movable platen, a second linkage connected to said ejector plate plunger, and means to actuate said second linkage independently of said first-named linkage whereby said ejector plate plunger is moved independently of the movement of the movable platen.

2. A molding machine comprising a pair of relatively movable platens, a die member carried by each of said platens, means to move one of said platens, a core plate carried by said movable platen, a core plate plunger secured to said core plate, an ejector plate carried by said movable platen, ejecting pins carried by said ejector plate, an ejector plate plunger on which said ejector plate is seated, said ejector plate plunger being hollow and said core plate plunger being movably disposed therein, a linkage connected to said core plate plunger, means to actuate said linkage whereby said core plate plunger is moved independently of the movement of the movable platen, a second linkage connected to said ejector plate plunger, and means to actuate said second linkage independently of said first-named linkage whereby said ejector plate plunger is moved independently of the movement of the movable platen.

3. A molding machine comprising a pair of relatively movable platens, a die member carried by each of said platens, means to move one of said platens, a core plate carried by said movable platen, a core plate plunger secured to said core plate, an ejector plate carried by said movable platen, ejecting pins carried by said ejector plate, an ejector plate plunger on which said ejector plate is seated, a linkage connected to said core plate plunger, means to actuate said linkage whereby said core plate plunger is moved independently of the movement of the movable platen, a second linkage connected to said ejector plate plunger, means to actuate said second linkage independently of said first-named linkage whereby said ejector plate plunger is moved independently of the movement of the movable platen, and separate means to adjust the stroke of each of said plungers respectively.

4. A molding machine comprising a pair of relatively movable platens, a die member carried by each of said platens, means to move one of said platens, a core plate carried by said movable platen, a core plate plunger secured to said core plate, an ejector plate carried by said movable platen, ejecting pins carried by said ejector plate, an ejector plate plunger on which said ejector plate is seated, a linkage connected to said core plate plunger, means to actuate said linkage whereby said core plate plunger is moved independently of the movement of the movable platen, a second linkage connected to said ejector plate plunger, and means to actuate said second linkage independently of said first-named linkage whereby said ejector plate plunger is moved independently of the movement of the movable platen, the actuating means for said linkage and for said second linkage being independent of each other.

5. A molding machine comprising a pair of relatively movable platens, a die member carried by each of said platens, means to move one of said platens, a core plate carried by said movable platen, a core plate plunger secured to said core plate, an ejector plate carried by said movable platen, ejecting pins carried by said ejector plate, an ejector plate plunger on which said ejector plate is seated, said ejector plate plunger being hollow and said core plate plunger being movably disposed therein, a linkage connected to said core plate plunger, means to actuate said linkage whereby said core plate plunger is moved independently of the movement of the movable platen, a second linkage connected to said ejector plate plunger, and means to actuate said second linkage independently of said first-named linkage whereby said ejector plate plunger is moved independently of the movement of the movable platen, the actuating means for said linkage and for said second linkage being independent of each other.

6. A molding machine comprising a pair of relatively movable platens, a die member carried by each of said platens, means to move one of said platens, an ejector plate carried by said movable platen, a pair of plungers on which said ejector plate is seated, one of said plungers being hollow and the other of said plungers being movably disposed therein, a linkage secured to one of said plungers, a second linkage secured to the other of said plungers, and means to separately actuate each of said linkages independently of the movement of the movable platen and independently of each other whereby the respective plungers will be moved independently of each other and independently of the movement of the movable platen.

7. A molding machine comprising a pair of relatively movable platens, a die member carried by each of said platens, means to move one of said platens, a core plate carried by said movable platen, a core plate plunger secured to said core plate, an ejector plate carried by said movable platen, ejecting pins carried by said ejector plate, an ejector plate plunger on which said ejector plate is seated, said ejector plate plunger being hollow and said core plate plunger being movably disposed therein, a linkage connected to said core plate plunger, means to actuate said linkage whereby said core plate plunger is moved independently of the movement of the movable platen, means connecting said linkage to said actuating means whereby said actuating means will travel in a straight line, a second linkage connected to said ejector plate plunger, means to actuate said second linkage independently of said first-named linkage whereby said ejector plate plunger is moved independently of the movement of the movable platen, and means connecting said second linkage to the actuating means therefor whereby said actuating means will travel in a straight line, the actuating means for said linkage and for said second linkage being independent of each other.

8. A molding machine comprising a pair of relatively movable platens, a die member carried by each of said platens, means to move one of said platens, a core plate carried by said movable platen, a core plate plunger secured to said core plate, an ejector plate carried by said movable platen, ejecting pins carried by said ejector plate, an ejector plate plunger on which said ejector plate is seated, said ejector plate plunger being hollow and said core plate plunger being movably disposed therein, a linkage connected to said core plate plunger, means to actuate said linkage whereby said core plate plunger is moved independently of the movement of the movable platen, adjustable means connecting said linkage to said actuating means whereby said actuating means will travel in a straight line and the stroke of said core plate plunger can be adjusted, a second linkage connected to said ejector plate plunger, means to actuate said second linkage independently of said first-named linkage whereby said ejector plate plunger is moved independently of the movement of the movable platen, and adjustable means connecting said second linkage to the actuating means therefor whereby said actuating means will travel in a straight line and the stroke of said ejector plate plunger can be adjusted, the actuating means for said linkage and for said second linkage being independent of each other.

EMERIK I. VALYI.

REFERENCES CITED

The following references are of record in the file of this patent:

UNITED STATES PATENTS

| Number | Name | Date |
|---|---|---|
| 1,724,332 | Will et al. | Aug. 13, 1929 |
| 2,409,725 | Whitmore | Oct. 22, 1946 |